July 14, 1970
R. A. BLESCH ET AL
3,520,621
REMOTE LEVELLING MEASUREMENT
Filed May 12, 1967
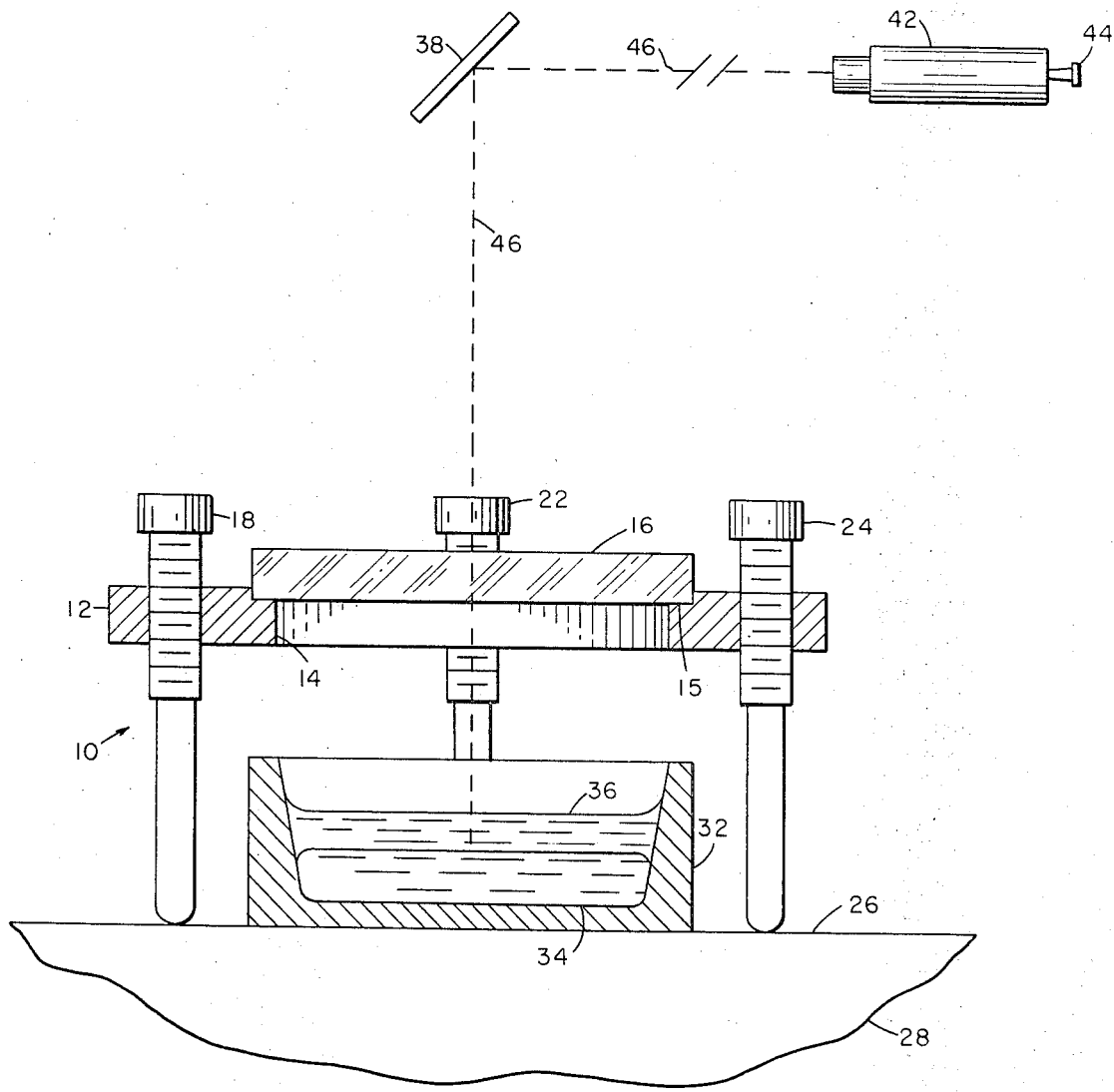
INVENTORS.
ROBERT A. BLESCH
CHARLES G. PORTER
OLIVER S. READING 3,520,621
REMOTE LEVELLING MEASUREMENT
Robert A. Blesch, Lisle, Ill., and Charles G. Porter, New York and Oliver S. Reading, Bellport, N.Y., assignors to the United States of America as represented by the United States Atomic Energy Commission
Filed May 12, 1967, Ser. No. 639,598
Int. Cl. G01b 1/00; G01c 21/06
U.S. Cl. 356—150
2 Claims

ABSTRACT OF THE DISCLOSURE

Apparatus which utilizes a collimated beam of light to indicate the roll and pitch of a device. The device is provided with a pool of mercury whose free surface is damped by high viscosity oil to establish a horizontal surface and also a plano-parallel optical flat which is partially silvered. The flat is parallel to the plane of the device whose level is to be indicated. A collimated beam is reflected by both the silvered surface and the free mercury surface, and the degree of separation of the reflected beams is an indication of the angular position of the optical flat.

BACKGROUND OF THE INVENTION

The invention described herein was made in the course of, or under a contract with the U.S. Atomic Energy Commission.

In the Alternating Gradient Synchrotron (AGS) located at the Brookhaven National Laboratory it becomes necessary from time to time to level one or more of the 240 large magnets distributed around the ring. Due to increasing background radiation in the vicinity of these magnets arising as a consequence of increasing the accelerator's intensity, it is becoming more time consuming to do maintenance and other work in the vicinity of the magnets as work must be delayed until radiation levels drop to safe values before workmen can enter the area following shutdown of the accelerator.

At the present time, in order to check the level of one of these large magnets, it is necessary for workmen to determine its angle with respect to roll and pitch, that is, its attitude, by taking measurements directly. There is no convenient way of determining remotely its attitude or to monitor it continuously as its position is adjusted because radiation damage to most transducers would cause rapid failure. Adjustment could be accomplished remotely, as for example, by the use of powered jacks.

SUMMARY OF THE INVENTION

The present invention overcomes the aforementioned difficulties by providing for a convenient, reliable and extremely accurate way of determining remotely the roll and pitch or attitude of an object. In accordance with this invention apparatus is provided to establish a first reflective surface which is always horizontal and a second surface which always indicates the roll and pitch or attitude of the plane of the device whose level is to be indicated. A collimated beam of light reflected by both surfaces produces a direct indication of the attitude of the object being monitored. The resulting indication is extremely accurate and reliable.

It is thus a principal object of this invention to provide a way of determining remotely the attitude of an object with geat accuracy, reliability and convenience.

Other objects and advantages of this invention will be readily apparent from the following description of a preferred embodiment of this invention given with reference to the accompanying drawing.

BRIEF DESCRIPTION OF THE DRAWING

The figure illustrates an elevational view in cross-section of a preferred embodiment of this invention.

DESCRIPTION OF THE PREFERRED EMBODIMENT

Referring to the figure, apparatus 10 consists of a support plate 12 having an opening 14 having mounted in recess 15 a plano-parallel optical flat 16 which is partially silvered on the upper surface. Three screws 18, 22, and 24 are threadably mounted as shown through support plate 12 to support on a machined surface 26 of device 28 which may be a magnet as mentioned earlier and whose attitude is such that surface 26 is parallel to the plane of the device 28 whose level is to be indicated. By the adjustment of screws 18, 22 and 24 it is possible in a manner to be explained below to position the silvered surface of flat 16 parallel to that of surface 26.

Beneath flat 16 and resting on surface 26 is a dish 32 containing a pool 34 of liquid mercury covered by a layer of high viscosity oil 36 for the purpose of damping and protecting the mercury surface from oxidation. Mounted in any convenient fashion, preferably stable and independent of any motion of device 28, above dish 32 is a flat mirror 38 and at a suitable remote region an autocollimator 42 having an eye-piece 44. Autocollimator 42, as is well known in the art, projects a beam of collimated light and is designed to receive a reflected beam and, since the instrument is focused at infinity, the reflection is in focus somewhere in the plane of the crosshairs of the instrument. When the reflection from a mirror surface is coincident with the crosshairs of the instrument, the line of sight is perpendicular to the mirror surface.

For the arrangement shown, it is only necessary that mirror 38 be mounted at an angle above dish 32 and autocollimator 42 be mounted and positioned such that the reflection from the surface of the mercury pool 34 be within the field of view of the instrument and nearly coincident with the crosshairs of the instrument. Also, the lower surface of flat 16 may be silvered surface to avoid any error introduced by lack of parallelism of the two surfaces of flat 16. When long distances are involved, as is true at an accelerator, one would not illuminate the crosshairs of the instrument but would instead project the light through a pair of narrow right-angled slits, as is understood in the art as "bright-line" autocollimation.

In order to utilize the apparatus just described, screws 18, 22 and 24 are adjusted so that the reflective surface of flat 16 is parallel to machined surface 26. Hence, when apparatus 10 is placed on machined surface 26, the partially silvered surface of flat 16 is parallel to the plane of device 28 whose level is to be indicated. In other words, flat 16 is horizontal when the reference plane of device 28 is at its desired orientation. Ordinarily mirror 38 would be placed at a 45° angle directly above dish 32 so that collimator 42 which is remotely located, is horizontal. Thus the latter, after being moved, need only be adjusted to a horizontal position when placed into use at its station. Providing device 28 is not too far out-of-level, one would see two pairs of bright reflected crosshairs in focus in the plane of the crosshairs of the instrument. The position of the dimmer reflection from flat 16 with respect to the brighter reflection from the surface of mercury pool 34 gives a measure of the level of device 28. To level device 28 it is only necessary to adjust it in roll and pitch until both reflections coincide.

After this initial set up is made, apparatus 10, which in practical application is small and compact, is left permanently in place on each device 28 or magnet. In order to check subsequently the attitude of device 28, autocollimator 42 need only be placed on its designated station and made horizontal and then pointed at mirror 38. The relative positions of the cross-hairs reflected from flat 16 will indicate the attitude of object 28. In this way the position of a magnet can be checked for level whenever desired without approaching or touching it. It is thus apparent that the accelerator employing these magnets need not be shut down merely for the purpose of checking their attitudes. Only in the event that adjusting is required, need this be done, or as an alternative, the adjustment can be accomplished by utilizing remotely energized jacks if desired.

In addition to the advantages of this invention already noted, it is apparent that it is useful as well in determining the relative positions of several devices to each other, and that only one reading is necessary to determine roll and pitch as compared to a minimum of three by more conventional approaches. Furthermore, as the inventive apparatus is small, has no attached wires or cables, and requires no power, it is much easier to handle and is quite portable.

It is thus seen that there has been provided a unique and efficient way of measuring remotely the roll and pitch of a surface. While only a preferred embodiment of the invention has been described it is understood that many variations thereof are possible without departing from the principles of this invention. For example, although mirror 38 is described as being preferably at a 45° angle, it in fact can be at any angle as long as the line-of-sight from autocollimator 42 is perpendicular (or nearly perpendicular) to the free surface of mercury 34. Mirror 38 even can be omitted if it were possible to establish a vertical line-of-sight directly to autocollimator 42.

We claim:

1. Apparatus for remotely determining the attitude of a device comprising:
   (a) means including and supporting a pool of liquid having a reflective upper surface whose plane at rest is horizontal;
   (b) means including and mounting on said device above said pool a transparent plate having a partially reflective flat surface, said plate provided with legs to orient said plate with respect to a suitable plane of said device; and
   (c) means for directing a collimated beam of light through said plate to the reflective upper surface of said pool;
   (d) the latter said means including means for receiving and comparing the alignment of the beam reflected from the partially reflective surface of said plate with that from the reflective upper surface of said pool, thereby indicating the roll and pitch of said plate with respect to the horizontal upper surface of said pool.

2. The apparatus of claim 1 in which the beam directing means is an autocollimator for comparing the reflected beams.

References Cited

UNITED STATES PATENTS 2,460,836   2/1949   Lovins _____ 356—249

RONALD L. WIBERT, Primary Examiner

P. K. GODWIN, JR., Assistant Examiner

U.S. Cl. X.R.

356—153, 249